United States Patent
Yang et al.

(10) Patent No.: US 10,334,580 B2
(45) Date of Patent: *Jun. 25, 2019

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,270

(22) Filed: Aug. 31, 2017

(65) Prior Publication Data

US 2017/0367080 A1 Dec. 21, 2017

Related U.S. Application Data

(63) Continuation of application No. 15/264,485, filed on Sep. 13, 2016, now Pat. No. 10,104,650, which is a
(Continued)

(30) Foreign Application Priority Data

Oct. 22, 2012 (KR) .................. 10-2012-0117223

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS 9,226,293 B2 12/2015 Yang et al.
9,252,918 B2 * 2/2016 Nory ................ H04L 1/0045
(Continued)

FOREIGN PATENT DOCUMENTS

CN 101483475 7/2009
JP WO 2010150512 A1 * 12/2010 ........... H04L 1/1861
(Continued)

OTHER PUBLICATIONS

U.S. Appl. No. 61/523,568.*
(Continued)

*Primary Examiner* — Kibrom T Hailu
(74) *Attorney, Agent, or Firm* — Lee Hong Degerman Kang & Waimey

(57) ABSTRACT

The present invention relates to a method for receiving a downlink control signal in a TDD-based wireless communication system, and to an apparatus therefor. The method comprises receiving a downlink signal via a downlink interval in a specific frame including the downlink interval, a guard interval and an uplink interval. A combination of the downlink interval, the guard interval and the uplink interval is given using configuration information on the specific subframe. When the configuration information is given such that the length of the downlink interval is larger than a specific value, detecting a first type of PDCCH is performed in the specific subframe. When the configuration information is given such that the length of the downlink interval is equal to or smaller than the specific value, detecting the first type of PDCCH is skipped in the specific subframe.

14 Claims, 16 Drawing Sheets

Related U.S. Application Data continuation of application No. 14/943,518, filed on Nov. 17, 2015, now Pat. No. 9,480,061, which is a continuation of application No. 14/070,325, filed on Nov. 1, 2013, now Pat. No. 9,225,497, which is a continuation of application No. 14/114,685, filed as application No. PCT/KR2012/008649 on Oct. 22, 2012, now Pat. No. 9,226,293.

(60) Provisional application No. 61/549,246, filed on Oct. 20, 2011, provisional application No. 61/678,597, filed on Aug. 1, 2012.

(51) Int. Cl.
*H04L 27/26* (2006.01)
*H04L 5/14* (2006.01)

(52) U.S. Cl.
CPC .......... *H04L 5/0082* (2013.01); *H04L 5/0092* (2013.01); *H04L 5/0094* (2013.01); *H04L 5/14* (2013.01); *H04L 5/1469* (2013.01); *H04L 27/26* (2013.01); *H04L 27/2601* (2013.01); *H04L 27/2602* (2013.01); *H04L 27/2607* (2013.01); *H04L 27/2656* (2013.01); *H04W 72/0446* (2013.01); *H04L 5/001* (2013.01); *H04L 5/0023* (2013.01)

(56) References Cited

U.S. PATENT DOCUMENTS

| | | | |
|---|---|---|---|
| 2009/0073922 A1* | 3/2009 | Malladi | H04L 1/0004 370/328 |
| 2010/0238845 A1 | 9/2010 | Love et al. | |
| 2010/0271970 A1 | 10/2010 | Pan et al. | |
| 2011/0170496 A1 | 7/2011 | Fong et al. | |
| 2011/0176461 A1 | 7/2011 | Astely et al. | |
| 2011/0222491 A1* | 9/2011 | Vajapeyam | H04L 1/0038 370/329 |
| 2011/0224066 A1 | 9/2011 | Schmidt et al. | |
| 2012/0002635 A1* | 1/2012 | Chung | H04L 5/0035 370/329 |
| 2012/0039232 A1 | 2/2012 | Kwon et al. | |
| 2012/0076043 A1* | 3/2012 | Nishio | H04L 1/1861 370/252 |
| 2012/0106465 A1* | 5/2012 | Haghighat | H04W 72/1289 370/329 |
| 2012/0320846 A1 | 12/2012 | Papasakellariou et al. | |
| 2013/0010685 A1 | 1/2013 | Kim et al. | |
| 2013/0039193 A1* | 2/2013 | Yin | H04W 72/0486 370/252 |
| 2013/0044692 A1 | 2/2013 | Nory et al. | |
| 2013/0083736 A1 | 4/2013 | Yin et al. | |
| 2013/0194980 A1 | 8/2013 | Yin et al. | |
| 2014/0031043 A1 | 1/2014 | Holma et al. | |
| 2014/0036742 A1* | 2/2014 | Charbit | H04W 52/0235 370/280 |
| 2014/0056188 A1 | 2/2014 | Yang et al. | |
| 2014/0105224 A1* | 4/2014 | Frederiksen | H04L 1/1887 370/465 |
| 2014/0355493 A1 | 12/2014 | Niu et al. | |
| 2015/0296542 A1* | 10/2015 | Heo | H04W 74/0833 370/329 |
| 2016/0073386 A1 | 3/2016 | Yang et al. | |
| 2017/0000658 A1 | 1/2017 | Chatterjee et al. | |

FOREIGN PATENT DOCUMENTS

| | | |
|---|---|---|
| JP | 2014-508471 | 4/2014 |
| KR | 10-2010-0044882 | 4/2010 |
| KR | 10-2010-0106577 | 10/2010 |
| WO | 2011-126024 | 10/2011 |
| WO | 2012/032726 | 3/2012 |
| WO | 2012/046403 | 4/2012 |

OTHER PUBLICATIONS

PCT International Application No. PCT/KR2012/008649, Written Opinion of the International Searching Authority dated Feb. 15, 2013, 12 pages.

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.3.0, Sep. 2011, 103 pages.

CMCC, "Discussion on ePDCCH Design for Special Subframes," 3GPP TSG-RAN WG1 #70, R1-123742, Aug. 2012, 5 pages.

CATT, et al., "Way Forward on Remaining details of RE mapping for ePDCCH," 3GPP TSG RAN WG1 Meeting #70, R1-123876, Aug. 2012, 2 pages.

European Patent Office Application Serial No. 12841332.5, Search Report dated May 29, 2015, 6 pages.

U.S. Appl. No. 14/114,685, Notice of Allowance dated Sep. 21, 2015, 24 pages.

NTT DoCoMo, "PDCCH Enhancement for Different TDD UL-DL Configuration on Different Bands," 3GPP TSG RAN WG1 Meeting #68, R1-120670, Feb. 2012, 5 pages.

Panasonic, "PDCCH Format 1A for DL data arrival," 3GPP TSG-RAN Meeting #55, R1-084234, Nov. 2008, 3 pages.

Motorola Mobility, "E-PDCCH Search Space," 3GPP TSG RAN WG1 #68, R1-120517, Feb. 2012, 3 pages.

Motorola, "Common PDCCH Design for Carrier Aggregation," 3GPP TSG RAN1 #56bis, R1-091327, Mar. 2009, 2 pages.

Nokia, et al., "Draft CR on PDCCH symbols in case of DRS," 3GPP TSG RAN Meeting #55, R1-084381, Nov. 2008, 2 pages.

Panasonic, "PDCCH format 0 for message 3 adaptive retransmission and transmission of control information in message 3 during contention based random access procedure," 3GPP TSG-RAN WG1 Meeting #55, R1-084699, Nov. 2008, 10 pages.

LTE, "Evolved Universal Terrestrial Radio Access (E-UTRA); Multiplexing and channel coding (3GPP TS 36.212 version 9.4.0 Release 9)," ETSI TS 136 212 V9.4.0, Oct. 2011, 63 pages.

ITRI, "Proposed text change for frame structure: co-existence with TD-SCDMA/LTE ratio," IEEE 802.16 Broadband Wireless Access Working Group, IEEE C802.16m-10/1300r3, Nov. 2010, 16 pages.

\* cited by examiner

FIG. 13

| SF#0 | SF#1 | SF#2 | SF#3 | SF#4 | SF#5 | SF#6 | SF#7 | SF#8 | SF#9 |
|------|------|------|------|------|------|------|------|------|------|
| D | S | U | U | U | D | S | U | U | U |
| ① | ② |   |   |   | ① | ② |   |   |   |

①: attempt to detect PDCCH (S-PDCCH) for special SF
②: in case of detecting S-PDCCH, PDSCH signal reception in special SF or PUSCH signal transmission in U corresponding to special SF

FIG. 14

| SF#0 | SF#1 | SF#2 | SF#3 | SF#4 | SF#5 | SF#6 | SF#7 | SF#8 | SF#9 |
|------|------|------|------|------|------|------|------|------|------|
| D | S | U | U | U | D | S | U | U | U |
| ① | ② |   |   |   | ① | ② |   |   |   |

①: according to configuration, attempt to detect L-PDCCH and/or E-PDCCH
②: possible to attempt to detect PDCCH under assumption that E-PDCCH is not transmitted. In particular, possible to attempt to detect L-PDCCH only

| SF#0 | SF#1 | SF#2 | SF#3 | SF#4 | SF#5 | SF#6 | SF#7 | SF#8 | SF#9 |
|------|------|------|------|------|------|------|------|------|------|
| X | S | X | X | X | X | S(X) | X | X | X |
|   | ① |   |   |   |   | (①) |   |   |   |

X: according to UL-DL configuration, configured to U or D, respectively
①: E-PDCCH detection is selectively performed according to special SF configuration or length of DwPTS

FIG. 17

[Table 6]

| Special subframe configuration | Normal cyclic prefix in downlink | | | Extended cyclic prefix in downlink | | |
|---|---|---|---|---|---|---|
| | DwPTS | Case #1 | Case #2 | DwPTS | Case #1 | Case #2 |
| 0 | $6592 \cdot T_s$ (3 symbols) | O | X | $7680 \cdot T_s$ (3 symbols) | O | X |
| 1 | $19760 \cdot T_s$ (9 symbols) | X | O | $20480 \cdot T_s$ (8 symbols) | X | O |
| 2 | $21952 \cdot T_s$ (10 symbols) | X | O | $23040 \cdot T_s$ (9 symbols) | X | O |
| 3 | $24144 \cdot T_s$ (11 symbols) | X | O | $25600 \cdot T_s$ (10 symbols) | X | O |
| 4 | $26336 \cdot T_s$ (12 symbols) | X | O | $7680 \cdot T_s$ (3 symbols) | O | X |
| 5 | $6592 \cdot T_s$ (3 symbols) | O | X | $20480 \cdot T_s$ (8 symbols) | X | O |
| 6 | $19760 \cdot T_s$ (9 symbols) | X | O | $23040 \cdot T_s$ (9 symbols) | X | O |
| 7 | $21952 \cdot T_s$ (10 symbols) | X | O | - | - | - |
| 8 | $24144 \cdot T_s$ (11 symbols) | X | O | - | - | - |

FIG. 18

[Table 7]

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ (3 symbols) | $2192 \cdot T_s$ | $2560 \cdot T_s$ | $7680 \cdot T_s$ (3 symbols) | $2192 \cdot T_s$ | $2560 \cdot T_s$ |
| 1 | $19760 \cdot T_s$ (9 symbols) | | | $20480 \cdot T_s$ (8 symbols) | | |
| 2 | $21952 \cdot T_s$ (10 symbols) | | | $23040 \cdot T_s$ (9 symbols) | | |
| 3 | $24144 \cdot T_s$ (11 symbols) | | | $25600 \cdot T_s$ (10 symbols) | | |
| 4 | $26336 \cdot T_s$ (12 symbols) | | | $7680 \cdot T_s$ (3 symbols) | $4384 \cdot T_s$ | $5120 \cdot T_s$ |
| 5 | $6592 \cdot T_s$ (3 symbols) | $4384 \cdot T_s$ | $5120 \cdot T_s$ | $20480 \cdot T_s$ (8 symbols) | | |
| 6 | $19760 \cdot T_s$ (9 symbols) | | | $23040 \cdot T_s$ (9 symbols) | | |
| 7 | $21952 \cdot T_s$ (10 symbols) | | | $12800 \cdot T_s$ (5 symbols) | | |
| 8 | $24144 \cdot T_s$ (11 symbols) | | | - | - | - |
| 9 | $13168 \cdot T_s$ (6 symbols) | | | | | |

FIG. 19

[Table 8]

| Special subframe configuration | Normal cyclic prefix in downlink | | | Extended cyclic prefix in downlink | | |
|---|---|---|---|---|---|---|
| | DwPTS | Case #1 | Case #2 | DwPTS | Case #1 | Case #2 |
| 0 | $6592 \cdot T_s$ (3 symbols) | O | X | $7680 \cdot T_s$ (3 symbols) | O | X |
| 1 | $19760 \cdot T_s$ (9 symbols) | X | O | $20480 \cdot T_s$ (8 symbols) | X | O |
| 2 | $21952 \cdot T_s$ (10 symbols) | X | O | $23040 \cdot T_s$ (9 symbols) | X | O |
| 3 | $24144 \cdot T_s$ (11 symbols) | X | O | $25600 \cdot T_s$ (10 symbols) | X | O |
| 4 | $26336 \cdot T_s$ (12 symbols) | X | O | $7680 \cdot T_s$ (3 symbols) | O | X |
| 5 | $6592 \cdot T_s$ (3 symbols) | O | X | $20480 \cdot T_s$ (8 symbols) | X | O |
| 6 | $19760 \cdot T_s$ (9 symbols) | X | O | $23040 \cdot T_s$ (9 symbols) | X | O |
| 7 | $21952 \cdot T_s$ (10 symbols) | X | O | $12800 \cdot T_s$ (5 symbols) | O | X |
| 8 | $24144 \cdot T_s$ (11 symbols) | X | O | - | - | - |
| 9 | $13168 \cdot T_s$ (6 symbols) | X | O | - | - | - |

METHOD AND APPARATUS FOR TRANSMITTING CONTROL INFORMATION IN WIRELESS COMMUNICATION SYSTEM

CROSS-REFRENCE TO RELATED APPLICATIONS

This application is a continuation of U.S. patent application Ser. No. 15/264,485, filed on Sep. 13, 2016, now U.S. Pat. No. 10/104,650, which is a continuation of U.S. patent application Ser. No. 14/943,518, filed on Nov. 17, 2015, now U.S. Pat. No. 9,480,061, which is a continuation of U.S. patent application Ser. No. 14/070,325, filed on Nov. 1, 2013, now U.S. Pat. No. 9,225,497, which is a continuation of U.S. patent application Ser. No. 14/114,685, filed on Oct. 29, 2013, now U.S. Pat. No. 9,226,293, which is the National Stage filing under 35 U.S.C. § 371 of International Application No. PCT/KR2012/008649, filed on Oct. 22, 2012, which claims the benefit of earlier filing date and right of priority to Korean Application No. 10-2012-0117223, filed on Oct. 22, 2012, and also claims the benefit of U.S. Provisional Application Nos. 61/549,246, filed on Oct. 20, 2011, and 61/678,597, filed on Aug. 1, 2012, the contents of which are all hereby incorporated by reference herein in their entirety.

TECHNICAL FIELD

The present invention relates to a wireless communication system, and more particularly, to a method of transmitting/receiving control information in a TDD (Time Division Duplex)-based wireless communication system and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION

Technical Objects

One object of the present invention is to provide a method and apparatus for efficiently transmitting/receiving control information in a wireless communication system. Another object of the present invention is to provide a channel format, resource allocation, a signal processing, and an apparatus therefor to efficiently transmit/receive the control information. Still another object of the present invention is to provide a method and apparatus for efficiently allocating resource to transmit/receive the control information.

Technical objects achieved by the present invention are not limited to the above-mentioned technical objects. And, other unmentioned technical objects can be clearly understood from the following description by those having ordinary skills in the technical field to which the present invention pertains.

Technical Solution

In an aspect of the present invention, disclosed herein is a method of performing a procedure for receiving a downlink control signal by a user equipment in a TDD (Time Division Duplex)-based wireless communication system, the method comprising receiving a downlink signal via a downlink period in a specific subframe comprising the downlink period, a guard period, and an uplink period. A combination of the downlink period, the guard period, and the uplink period is given by using configuration information for the specific subframe, if the configuration information is given such that a length of the downlink period is greater than a specific value is provided, a detection process for a PDCCH (physical downlink control channel) of a first type is performed in the specific subframe, if the configuration information is given such that the length of the downlink period is equal to or less than the specific value, the detection process for the PDCCH of the first type is skipped, the PDCCH of the first type indicates a PDCCH configured within a resource region starting from an $N^{th}$ OFDM symbol in a subframe, and N is an integer of 2 or more.

In another aspect of the present invention, disclosed herein is a communication device used for in a TDD (time division duplex)-based wireless, communication system comprising a radio frequency (RF) unit and a processor. The processor is configured to receive a downlink signal via a downlink period in a specific subframe comprising the downlink period, a guard period, and an uplink period, a combination of the downlink period, the guard period, and the uplink period is given by using configuration information for the specific subframe, if the configuration information is given such that a length of the downlink period is greater than a specific value, a detection process for a PDCCH (physical downlink control channel) of a first type is performed in the specific subframe, if the configuration information is given such that the length of the downlink period is equal to or less than the specific value, the detection process for the PDCCH of the first type is skipped, the PDCCH of the first type indicates a PDCCH configured within a resource region starting from a $N^{th}$ OFDM symbol in a subframe, and N is integers greater than or equals to 2.

Preferably, an extended CP (cyclic prefix) is configured for a downlink transmission, and the specific value is 6 OFDM symbols.

Preferably, an extended CP is configured for a downlink transmission, and the length of the downlink period is given by a following table according to the configuration information:

| Configuration information | Length of downlink period (the number of OFDM symbol) |
| --- | --- |
| 0 | 3 |
| 1 | 8 |
| 2 | 9 |
| 3 | 10 |
| 4 | 3 |
| 5 | 8 |
| 6 | 9 |
| 7 | 5 | wherein if the configuration information corresponds to #1, #2, #3, #5 or #6, the detection process for the PDCCH of the first type is performed in the specific subframe, and if the configuration information corresponds to #0, #4 or #7, the detection process for the PDCCH of the first type is skipped in the specific subframe.

Preferably, a normal CP (cyclic prefix) is configured for a downlink transmission, and the specific value is 3 OFDM symbols.

Preferably, a normal CP (cyclic prefix) is configured for a downlink transmission, and the length of the downlink period is given by a following table in the according to the configuration information:

| Configuration information | Length of downlink period (the number of OFDM symbol) |
| --- | --- |
| 0 | 3 |
| 1 | 9 |
| 2 | 10 |
| 3 | 11 |
| 4 | 12 |
| 5 | 3 |
| 6 | 9 |
| 7 | 10 |
| 8 | 11 |
| 9 | 6 | wherein if the configuration information corresponds to #1 to #4 or #6 to #9, the detection process for the PDCCH of the first type is performed in the specific subframe, and if the configuration information corresponds to #0 or #5, the detection process for the PDCCH of the first type is skipped in the specific subframe.

Preferably, if the configuration information is given such that the length of the downlink period is equal to or less than the specific value, the detection process for a PDCCH of a second type is performed in the specific subframe and the PDCCH of the second type indicates a PDCCH configured within a resource region of $0^{th}$ to N-$1^{th}$ OFDM symbol in a subframe.

Advantageous Effects

According to the present invention, control information can be efficiently transmitted and received in a wireless communication system. In particular, the present invention may be able to provide a channel format for efficiently transmitting/receiving the control information, resource allocation, a signal processing method. In more particular, the present invention may be able to efficiently allocate resource for transmitting/receiving the control information.

Effects obtainable from the present invention are not limited to the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 13 to FIG. 15 indicates an example of PDCCH transmission and detection according to embodiment of the present invention;

FIG. 16 is a diagram for explaining an example of a base station and a user equipment applicable to the present invention.

FIGS. 17, 18, and 19 are tables showing examples according to embodiments of the present invention.

DETAILED DESCRIPTION OF THE INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and LTE-A (LTE-Advanced) is an evolved version of 3GPP LTE. For clarity, the following description mainly concerns 3GPP LTE system or 3GPP LTE-A system, by which the technical idea of the present invention may be non-limited.

A user equipment receives information from a base station via a downlink (DL) and transmits information to the base station via an uplink (UL) in a wireless communication system. The information transceived by the base station and the user equipment includes data and various control information and there may exist various physical channels according to a kind and usage of the information transceived by the user equipment and the base station.

Figure 1:
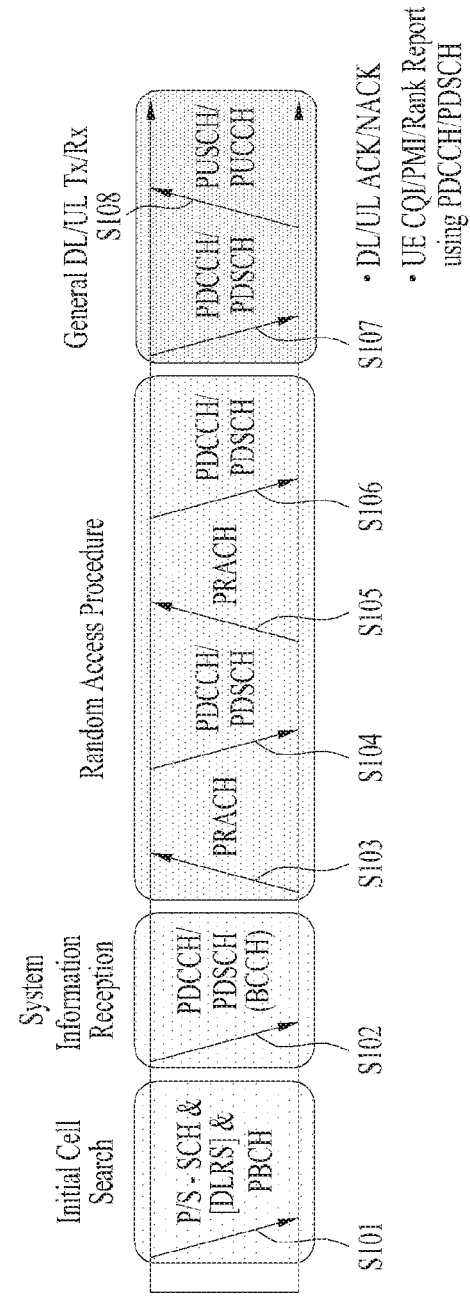
FIG. 1 is a diagram for explaining an example of physical channels used for 3GPP LTE system and a general signal transmission method using the same.

FIG. 1 illustrates a diagram for explaining a general method of transmitting physical channels used for 3GPP LTE system and signals via the same.

Referring to FIG. 1, if a power of a user equipment is turned on or the user equipment enters a new cell, the user equipment may perform an initial cell search for synchronizing with a base station and the like [S101]. To this end, the user equipment may receive a primary synchronization channel (P-SCH) and a secondary synchronization channel (S-SCH) from the base station, may synchronize with the base station, and then may obtain information such as a cell ID and the like. Subsequently, the user equipment may receive a physical broadcast channel (PBCH) from the base station and then may be able to obtain broadcast information within the cell. Meanwhile, the user equipment may receive a downlink reference signal (DL RS) and may be then able to check a downlink channel state.

Having completed the initial cell search, the user equipment may receive a physical downlink control channel (PDCCH) and a physical downlink shared channel (PDSCH) according to the physical downlink control channel (PDCCH) and may be then able to obtain detailed system information [S102].

Then, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a Physical Uplink Shared Channel/Physical Uplink Control Channel (PUSCH/PUCCH) transmission [S108] as a general uplink/downlink signal transmission procedure. Control information transmitted to a base station by a user equipment may be commonly named uplink control information (hereinafter abbreviated UCI). The UCI may include Hybrid Automatic Repeat and reQuest Acknowledgement/Negative-ACK (HARQ-ACK/NACK), Scheduling Request (SR), Channel State Information (CSI), and the like. The CSI may include Channel Quality Indication (CQI), Precoding Matrix Indication (PMI), Rank Indication (RI) information and the like. In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
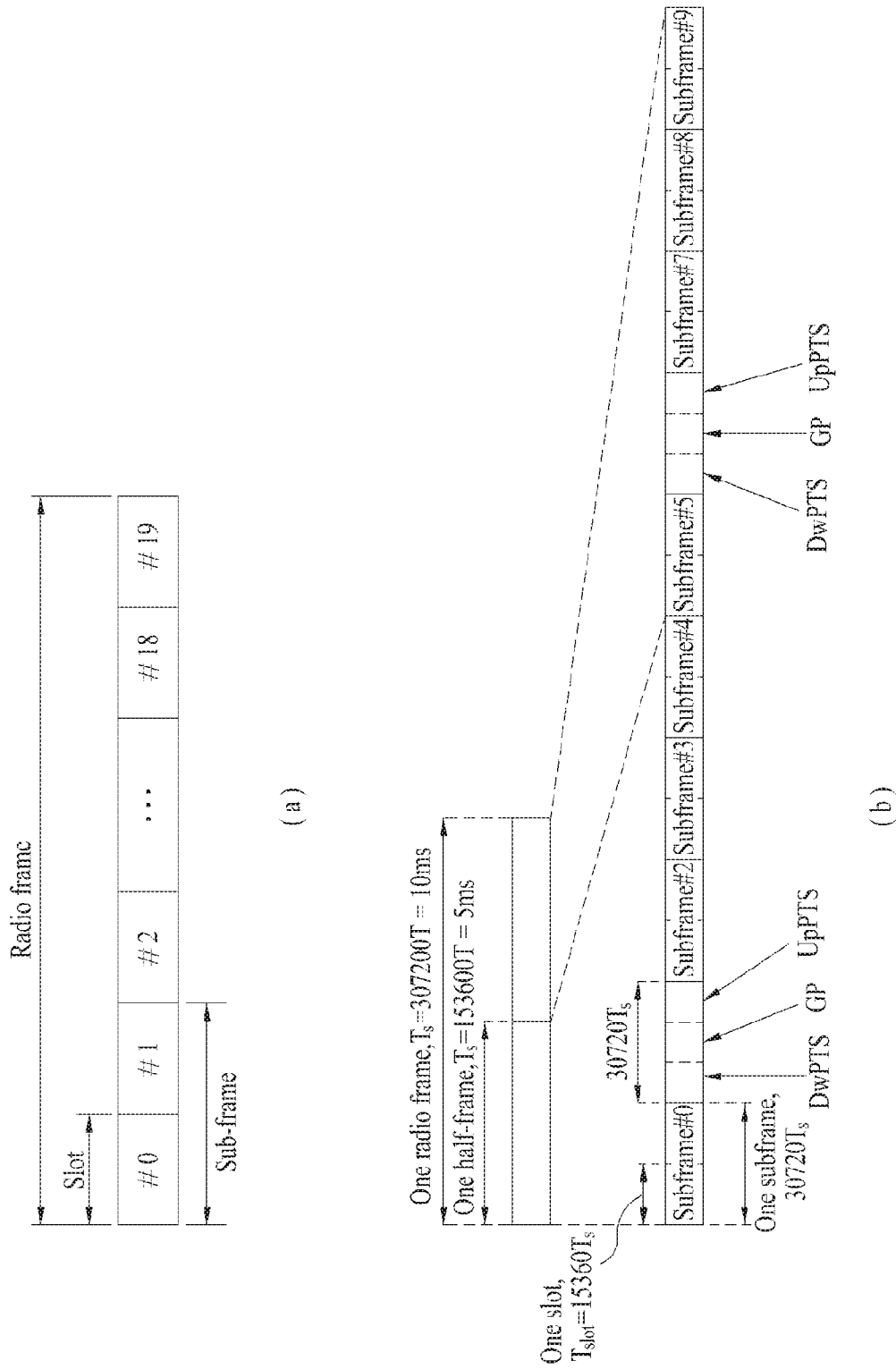
FIG. 2 is a diagram for explaining an example of a structure of a radio frame.

FIG. 2 illustrates an example of a radio frame structure. UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (Frequency Division Duplex) and a type-2 radio frame structure applicable to TDD (Time Division Duplex) are supported.

FIG. 2($a$) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in the time domain and may include a plurality of resource blocks (RBs) in the frequency domain. Since 3GPP LTE system uses OFDM in downlink, OFDM symbol represents one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of cyclic prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since the length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2($b$) is a diagram for a structure of a downlink radio frame of type 2. A type-2 radio frame includes 2 half frames. Each of the half frame includes 4 (5) normal subframes and 1 (0) special subframe. The normal subframe may be used for UL or DL according to an uplink-downlink configuration. Each of subframes includes 2 slots.

Table 1 is an example of a subframe configuration in a radio frame according to the UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D indicates a DL subframe, U indicates an UL subframe, and S indicates a special subframe, respectively. The special subframe includes DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference between uplink and downlink, which is generated in uplink due to multi-path delay of a downlink signal.

The above-described structures of the radio frame are exemplary only. And, the number of subframes included in a radio frame, the number of slots included in the subframe and the number of symbols included in the slot may be modified in various ways.

Figure 3:
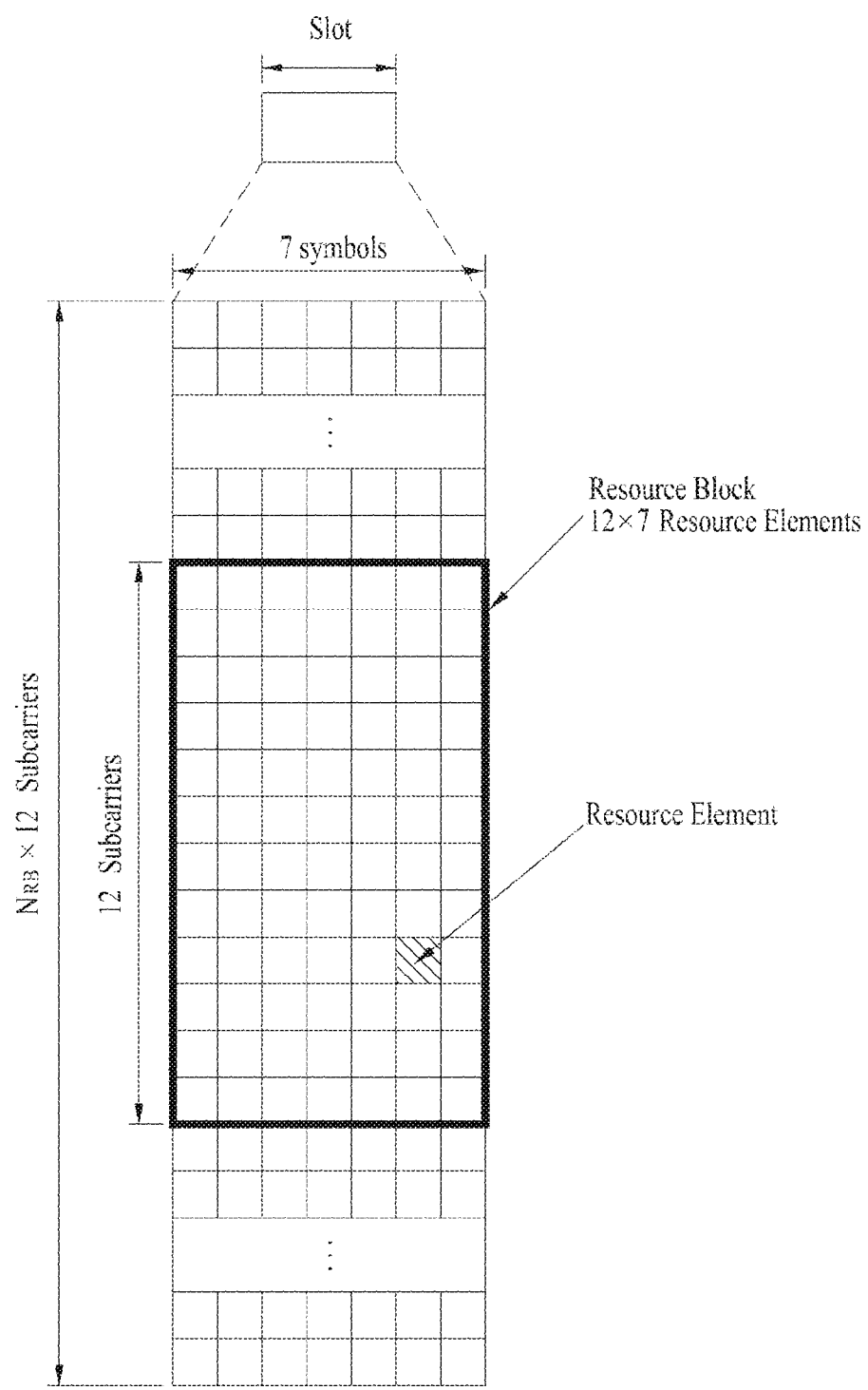
FIG. 3 is a diagram for one example of a resource grid for a downlink slot.

FIG. 3 illustrates an exemplary resource grid for a downlink slot.

Referring to FIG. 3, one downlink (DL) slot may include a plurality of OFDM symbols in the time domain. In particular, one DL slot exemplarily includes 7 OFDM symbols and one resource block (RB) exemplarily includes 12 subcarriers in the frequency domain, but the present invention is not limited thereto. Each element on a resource grid is referred to as a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
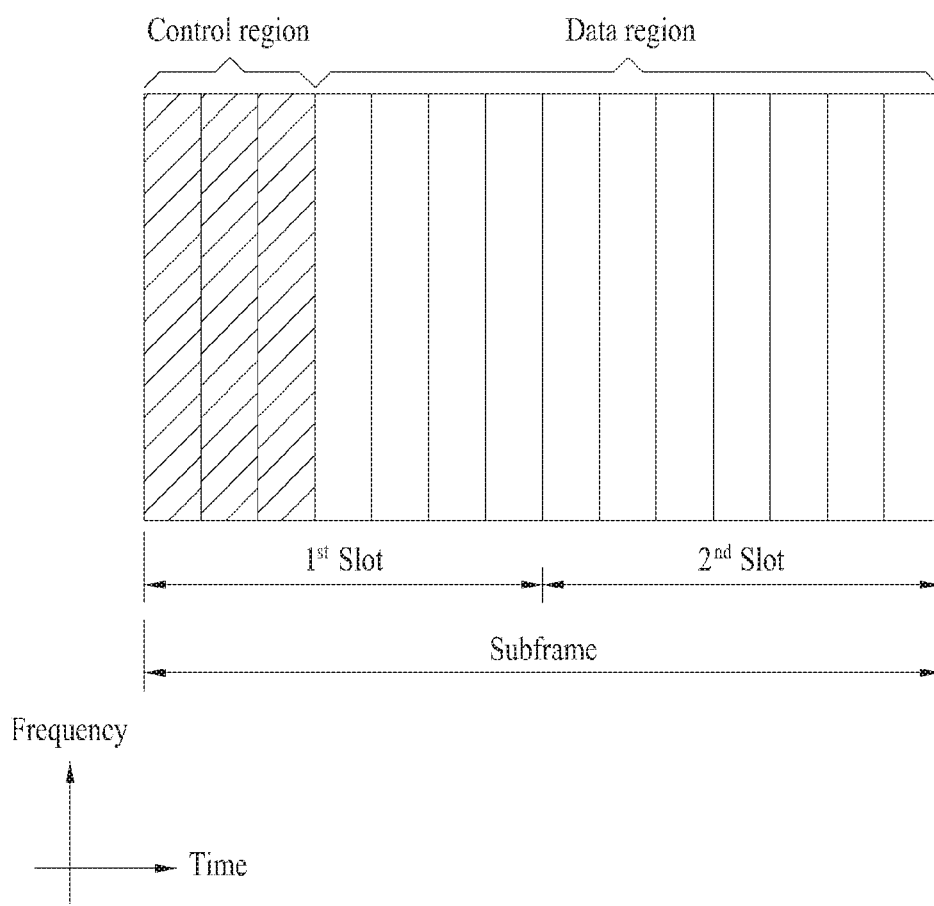
FIG. 4 is a diagram for a structure of a downlink subframe.

FIG. 4 illustrates an exemplary structure of a downlink subframe.

Referring to FIG. 4, maximum 3 (4) OFDM symbols situated in a head part of a first slot of one subframe correspond to a control region to which control channels are allocated. The rest of OFDM symbols correspond to a data region to which PDSCH (physical downlink shared channel) is allocated and a basic resource unit of the data region is an RB. Examples of DL control channels used by LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH is a response to UL transmission and carries a HARQ ACK/NACK (hybrid automatic repeat request acknowledgement/non-acknowledgement) signal. Control information carried on PDCCH may be referred to as downlink control information (hereinafter abbreviated DCI). The DCI may include UL scheduling information, DL scheduling information or a UL transmit power control command for a UE (user equipment) group.

Control information carried on PDCCH may be called downlink control information (DCI: downlink control information). DCI formats of formats 0, 3, 3A, and 4 are defined for uplink and DCI formats of formats 1, 1A, 1B, 1C, 1D, 2, 2A, 2B, 2C and the like are defined for downlink. According to DCI format, a kind of information field, the number of information field, the number of bits of each information field and the like may vary. For instance, DCI format may be able to selectively include a hopping flag, an RB assignment, an MCS (modulation coding scheme), an RV (redundancy version), an NDI (new data indicator), a TPC (transmit power control), a HARQ process number, a PMI (precoding matrix indicator) confirmation and the like according to a usage. Hence, a size of control information matched with DCI format may be different according to DCI format. Meanwhile, a DCI format can be used for transmitting two or more kinds of control information. For instance, DCI format 0/1A is used for carrying DCI format 0 or DCI format 1, and DCI format 0 and DCI format 1 are distinguished by a flag field.

PDCCH is able to carry a transmission format for DL-SCH (downlink shared channel) and resource allocation, resource allocation information for UL-SCH (uplink shared channel), paging information for PCH (paging channel), system information on DL-SCH, resource allocation information of an upper layer control message such as a random access response transmitted on PDSCH, a transmit power control command for individual user equipments within a random user equipment (UE) group, activation of VoIP (voice over IP) and the like. A plurality of PDCCHs may be transmitted in a control region and a user equipment may monitor a plurality of PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to be transmitted to a user equipment and attaches CRC (cyclic redundancy check) to the control information. CRC is masked with a unique identifier (called RNTI (radio network temporary identifier)) in accordance with an owner or usage of PDCCH. If PDCCH is provided for a specific user equipment, CRC may be masked with a unique identifier of the user equipment, i.e., C-RNTI (i.e., Cell-RNTI). As another example, if PDCCH is provided for a paging message, CRC may be masked with a paging indication identifier (e.g., P-RNTI (Paging-RNTI)). If PDCCH is provided for system information, and more particularly, for a system information block (SIB), which shall be described later, CRC may be masked with a system information identifier (e.g., SI-RNTI (system information-RNTI). In order to indicate a random access response that is a response to a transmission of a random access preamble of a user equipment, CRC may be masked with RA-RNTI (random access-RNTI).

PDCCH carries a message that is known as DCI (downlink control information) and DCI may include resource allocation information and other control information for one user equipment or UE group. In general, a plurality of PDCCHs may be transmitted within a subframe. Each PDCCH is transmitted using at least one CCE (control channel element) and each CCE corresponds to 9 sets of resource elements, each set comprising 4 resource elements. The 4 resource elements are referred to as an REG (Resource Element Group). 4 QPSK (quadrature phase shift keying) symbols are mapped to each REG Resource elements occupied by RS (reference signal) are not included in REG In particular, the total number of REGs in a OFDM symbol may vary depending on whether a cell-specific reference signal exists. The concept of REG (i.e., mapping by a unit of group comprising 4 resource elements) may apply to other DL control channels (e.g., PCFICH, PHICH, etc.). In particular, REG is used for a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered contiguously. In order to simplify a decoding process, PDCCH has a format comprising n CCEs and may start in a CCE having a number corresponding to multiple of n. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of a user equipment having a poor channel state (e.g., a case that the user equipment is located on a cell edge or boundary), 8 CCEs may be required for sufficient robustness. Besides, a power level of PDCCH may be adjusted according to channel condition.

A method introduced to LTE is to define a limited set of CCE positions where PDCCH is able to be positioned for each user equipment. The limited set of CCE positions for which a user equipment is able to search its own PDCCH may be referred to as a search space (SS). In LTE system, the search space may have a different size in accordance with each PDCCH format. And, a UE-specific and common search space are separately defined. The UE-specific search space may be individually configured for each user equipment and the range of the common search space is known to all user equipments. The UE-specific and common search space may be overlapped for a given user equipment. In case that a small search space is given, a base station may be unable to find CCE resources enough to transmit PDCCH to all available user equipments in a given subframe. In order to minimize this blocking that may be kept in a next subframe, a UE-specific hopping sequence may apply to a start point of the UE-specific search space.

Table 3 shows sizes of a common search space and a UE-specific search space.

TABLE 3

| PDCCH format | Number of CCEs (n) | Number of PDCCH candidates in Common | Number of PDCCH candidates in UE-specific |
|---|---|---|---|
| 0 | 1 | — | 6 |
| 1 | 2 | — | 6 |
| 2 | 4 | 4 | 2 |
| 3 | 8 | 2 | 2 |

In order to keep a computation load according to due to the total count of blind decoding (BD) attempts under control, a user equipment is not required to perform searches for all the defined DCI formats at the same time. In general, the user equipment always searches a UE-search space for DCI format 0 and DCI format 1A. The DCI format 0 and the DCI format 1A are equal to each other in size and may be identified by a flag included in a message. And, the user equipment may be required to receive an additional format, e.g., format 1, 1B, or 2 according to the PDSCH transmission mode configured by a base station. The user equipment may be able to search a common search space for DCI format 1A and DCI format 1C. Moreover, the user equipment may be configured to search for DCI format 3 or DCI format 3A. In this case, the DCI format 3/3A may have the same size as that of the DCI format 0/1A, and they may be distinguished from each other by scrambling CRC with different (common) identifiers other than a UE-specific identifier. PDSCH transmission scheme according to a transmission mode and information contents of DCI formats are described in following.

Transmission Mode (TM)
Transmission mode 1: transmission from a single antenna port of a base station
Transmission mode 2: transmit diversity
Transmission mode 3: open-loop spatial multiplexing
Transmission mode 4: closed-loop spatial multiplexing
Transmission mode 5: multi-user MIMO
Transmission mode 6: closed-loop rank-1 precoding
Transmission mode 7: single antenna port (port 5) transmission
Transmission mode 8: double layers transmission (ports 7 and 8) or single antenna port (port 7 or 8) transmission
Transmission mode 9: maximum 8 layers transmission (ports 7 to 14) or single antenna port (port 7 or 8) transmission DCI format
Format 0: resource grant for PUSCH transmission (uplink)
Format 1: resource assignment for single codeword PDSCH transmission (transmission modes 1, 2 and 7)
Format 1A: compact signaling of resource assignment for single codeword PDSCH (all modes)
Format 1B: compact resource assignment for PDSCH using rank-1 closed loop precoding (mode 6)
Format 1C: very compact resource assignment for PDSCH (e.g. paging/broadcast system information)
Format 1D : compact resource assignment for PDSCH using multi-user MIMO (mode 5)
Format 2: resource assignment for PDSCH for closed-loop MIMO operation (mode 4)
Format 2A: resource assignment for PDSCH for open-loop MIMO operation (mode 3)
Format 3/3A: power control command with 2-bit/1-bit power adjustment value for PUCCH and PUSCH In consideration of the above description, a user equipment may be required to perform maximum 44 times of blind decoding in a single subframe. Since checking an identical message with different CRC values requires only a trivial additional computational complexity, checking the identical message with different CRC values is not included in count of blind decoding.

Figure 5:
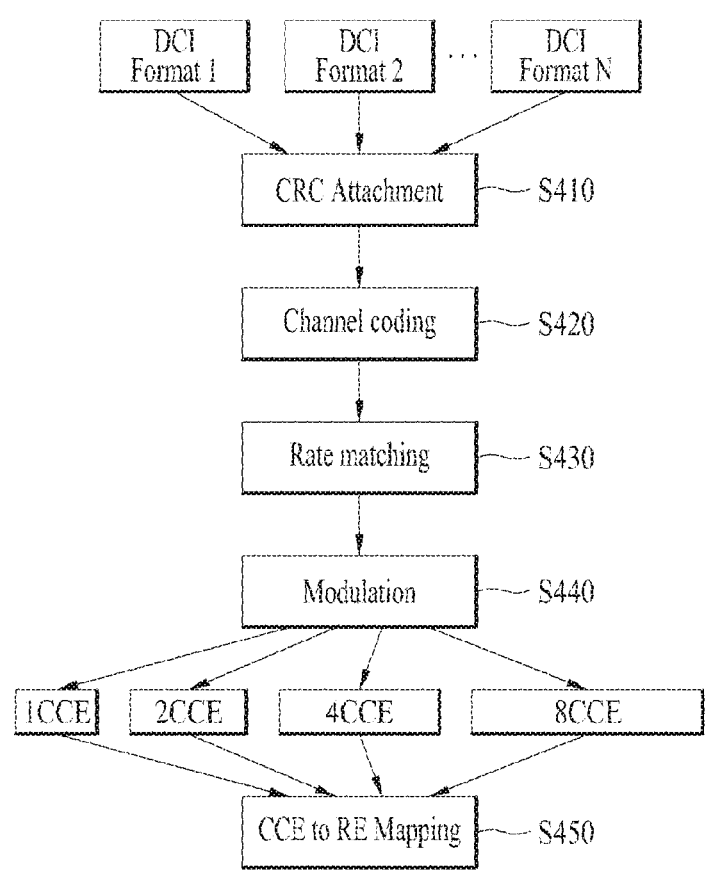
FIG. 5 is a flowchart for explaining an example of PDCCH configuring process of a base station.

FIG. 5 illustrates a flowchart for constructing PDCCH in a base station.

Referring to FIG. 5, a base station generates control information according to a DCI format. The base station may be able to select one DCI format among a plurality of DCI formats (DCI format 1, 2, . . . , N) according to control information to be transmitted to a user equipment. A CRC (cyclic redundancy check) used for detecting an error is attached to the control information generated according to each of the DCI formats [S410]. The CRC is masked with an identifier (e.g., RNTI (radio network temporary identifier)) in accordance with an owner or usage of PDCCH. In other words, PDCCH is CRC scrambled with the identifier (e.g., RNTI).

Table 4 shows an example of identifiers masked to PDCCH.

TABLE 4

| Type | Identifier | Description |
| --- | --- | --- |
| UE-specific | C-RNTI, temporary C-RNTI, semi-persistent C-RNTI | Used for unique identification of user equipment |
| Common | P-RNTI | Used for paging message |
| | SI-RNTI | Used for system information |
| | RA-RNTI | Used for random access response |

In case that a C-RNTI, a temporary C-RNTI, or a semi-persistent C-RNTI is used, PDCCH carries control information for corresponding specific user equipment. In case that of the other RNTIs are used, PDCCH carries common control information which all user equipments within a cell receive. A base station creates a coded data (codeword) by performing a channel coding on the CRC attached control information [S420]. The base station performs a rate matching in accordance with a CCE aggregation level assigned to a PDCCH format [S430] and generates modulated symbols by modulating the coded data [S440]. The modulated symbols constructing one PDCCH may have a CCE aggregation level set to one of 1, 2, 4 and 8. Thereafter, the base station maps the modulated symbols to physical resource elements (REs), i.e., CCE to RE mapping [S450].

Figure 6:
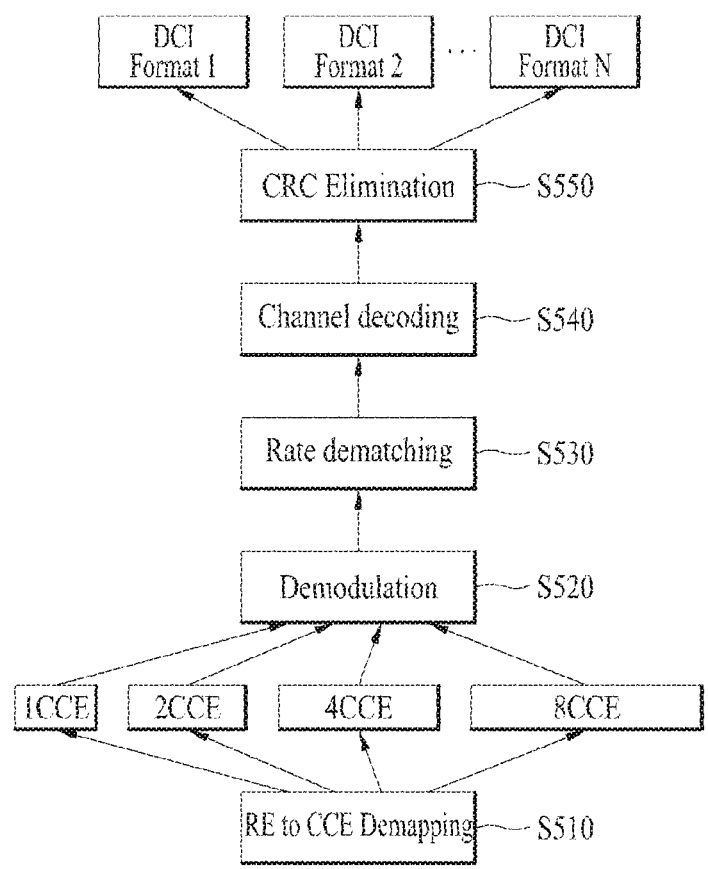
FIG. 6 is a diagram for explaining an example of PDCCH processing process of a user equipment.

FIG. 6 illustrates a flowchart for processing PDCCH in a user equipment.

Referring to FIG. 6, a user equipment de-maps a physical resource element to CCE, i.e., RE to CCE demapping [S510]. Since the user equipment does not know which CCE aggregation level should be used to receive PDCCH, the user equipment performs demodulation with respect to each of the CCE aggregation levels [S520]. The user equipment performs a rate dematching for the demodulated data. Since the user equipment does not know which DCI format (or DCI payload size) is used for the control information, the user equipment performs a rate de-matching in accordance with each DCI format (or DCI payload size) [S530]. The user equipment performs a channel decoding on the rate de-matched data according to a code rate, checks a CRC, and then detects whether there is an error [S540]. If an error does not occur, it indicates that the user equipment has found out PDCCH for its own. If an error occurs, the user equipment continuously performs a blind decoding for a different CCE aggregation level or a different DCI format (or DCI payload size). The user equipment, which has found out PDCCH of its own, eliminates the CRC from the decoded data and then obtains the control information.

A plurality of PDCCHs for a plurality of user equipments may be transmitted within a control region of an identical subframe. A base station does not provide the user equipment with information about location of a corresponding PDCCH within the control region. Hence, the user equipment searches the subframe for PDCCH for its own in a manner of monitoring a set of PDCCH candidates. In this case, the term 'monitoring' means that a user equipment attempts to decode each of PDCCH candidates in accordance with each of PDCCH formats. This is referred to as a blind decoding (blind detection). By means of blind decoding, the user equipment simultaneously performs identification of PDCCH transmitted to the user equipment and decoding of the control information transmitted on a corresponding PDCCH. For instance, when PDCCH is de-masked with C-RNTI, if an error does not occur, it indicates that the user equipment has found out PDCCH of its own.

Meanwhile, in order to reduce an overhead of blind decoding, the number of DCI formats is defined less than a kind of the control information transmitted on a PDCCH. A DCI format includes a plurality of information fields different from each other. According to a DCI format, a kind of the information field, the number of the information field, a bit number of each of the information fields and the like may vary. In addition, a size of the control information, which is matched with the DCI format, may vary according to the DCI format. Any DCI format can be used for transmitting two or more kinds of control information.

Figure 7:
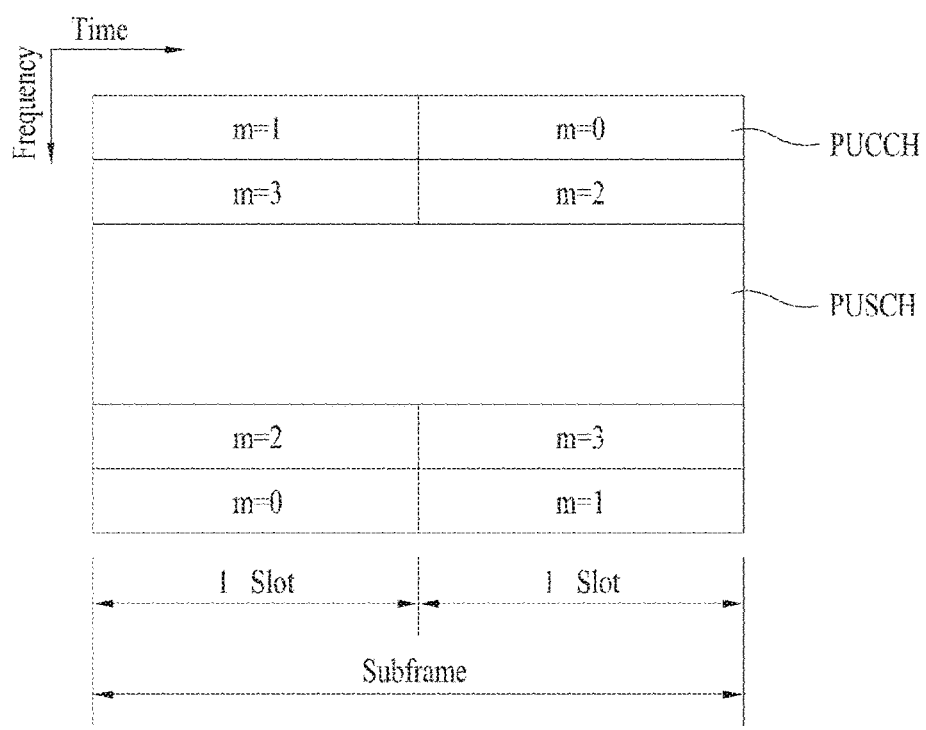
FIG. 7 is a diagram for a structure of an uplink subframe.

FIG. 7 illustrates an exemplary structure of an uplink subframe used in LTE system.

Referring to FIG. 7, an uplink subframe includes a plurality of slots (e.g., 2 slots). A slot may include a different number of SC-FDMA symbols according to the length of CP. As one example, in case of normal CP, a slot may include 7 SC_FDMA symbols. A UL subframe may be divided into a control region and a data region in the frequency domain. The data region includes PUSCH and is used for transmitting a data signal such as voice and the like. The control region includes PUCCH and is used for transmitting control information. The PUCCH includes a RB pair (e.g., m=0, 1, 2, 3) located at both ends of the data region and hops on a slot boundary. The control information includes HARQ-ACK/NACK, CQI (Channel Quality Information), PMI (Precoding Matrix Indicator), RI (Rank Indication), and the like.

Figure 8:
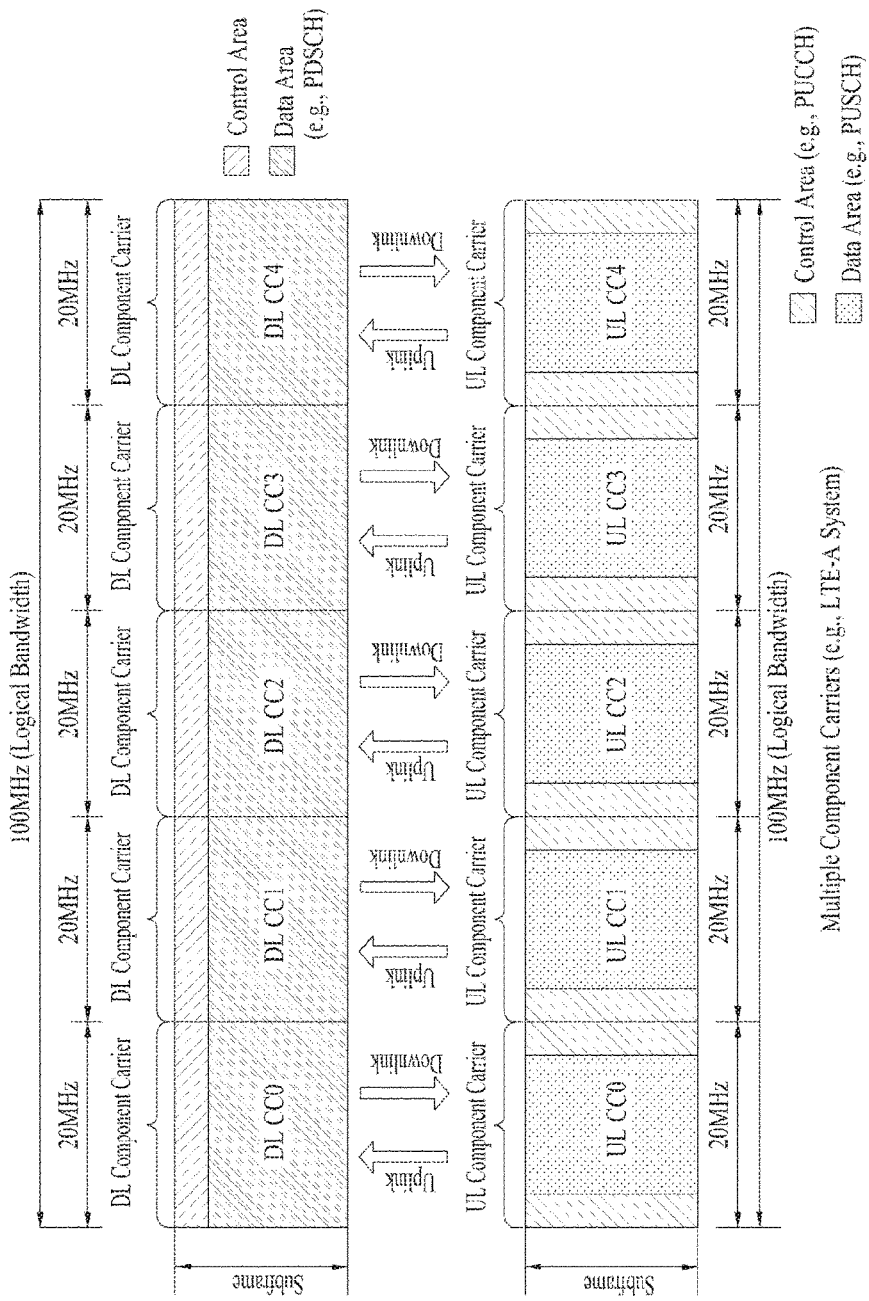
FIG. 8 is a diagram for explaining an example of a carrier aggregation (CA) communication system.

FIG. 8 illustrates an exemplary communication system for carrier aggregation (CA).

Referring to FIG. 8, a wider UL/DL bandwidth can be supported by aggregating a plurality of UL/DL component carriers (CCs). Each of the component carriers may be adjacent to each other or non-adjacent to each other. The bandwidth of each component carrier may be determined independently. An asymmetric carrier aggregation is also possible, which means that the number of downlink component carrier (DL CC) and the number of uplink component carrier (UL CC) are different from each other. Meanwhile, control information may be configured to be communicated on a specific CC only. The specific CC may be referred to as a primary CC and the other CCs may be referred to as a secondary CC. As one example, in case that a cross-carrier scheduling (or cross-CC scheduling) is applied, PDCCH for DL assignment may be transmitted on a DL CC #0 and corresponding PDSCH may be transmitted on a DL CC #2. The term 'component carrier' may be replaced by another equivalent term (e.g., a carrier, a cell, and the like).

For cross-CC scheduling, CIF (carrier indicator field) is used. A configuration of whether or not CIF exists within PDCCH may be enabled semi-statically and user-specifically (or user group-specifically) via upper layer signaling (e.g., RRC signaling).

Basics of PDCCH transmission may be summarized as follows.

CIF disabled: PDCCH on DL CC assigns resources for PDSCH on the same DL CC or resources for PUSCH on a single linked UL CC.
No CIF
CIF enabled: PDCCH on DL CC assigns resources for PDSCH or PUSCH to one of multiple aggregated DL/UL CCs using CIF.
LTE DCI format expanded to have CIF
CIF (when configured) has a fixed x-bit field (e.g., x=3)
A position of CIF (when configured) is fixed irrespective of the size of DCI format In case that a CIF exists within a PDCCH, a base station may assign a monitoring DL CC (set) so that BD complexity is reduced on a user equipment side. For scheduling of PDSCH/PUSCH, a user equipment may perform detection/decoding of PDCCH on a corresponding DL CC only. In addition, the base station may transmit PDCCH via a monitoring DL CC only. A monitoring DL CC set may be configured UE-specifically, UE group-specifically or cell-specifically.

Figure 9:
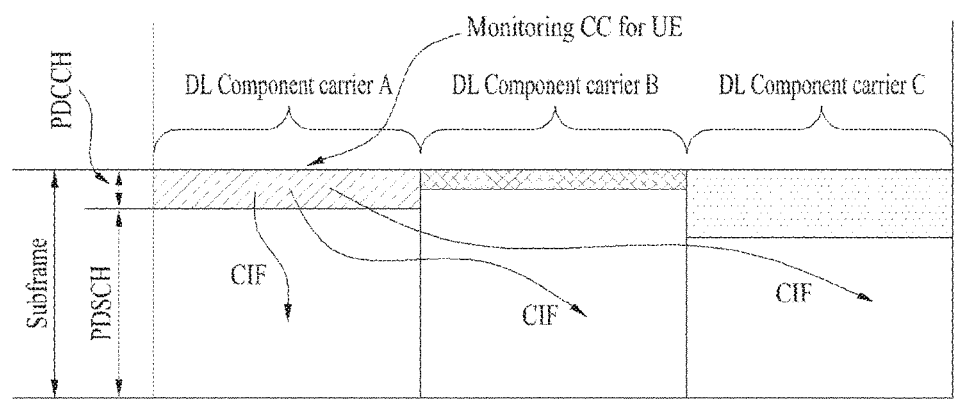
FIG. 9 is a diagram for explaining an example of a cross-carrier scheduling.

FIG. 9 illustrates an exemplary case that 3 DL CCs are aggregated and DL CC A is configured as a monitoring DL CC. If CIF is disabled, each of DL CCs may be able to transmit a PDCCH, which schedules a PDSCH of each of the DL CCs, without a CIF according to an LTE PDCCH rule. On the other hand, if CIF is enabled by upper layer signaling, only DL CC A may be able to transmit a PDCCH, which schedules a PDSCH of a different DL CC as well as a PDSCH of DL CC A using a CIF. PDCCH is not transmitted on DL CC B and DL CC C, which are not configured as a monitoring DL CC. In this case, the term 'monitoring DL CC' may be replaced by another equivalent term such as a monitoring carrier, a monitoring cell, a scheduling carrier, a scheduling cell, a serving carrier, a serving cell, and the like. A DL CC carrying PDSCH corresponding to PDCCH or a UL CC carrying PUSCH corresponding to PDCCH may be referred to as a scheduled carrier, a scheduled cell or the like.

In a 3GPP LTE/LTE-A system, as described with reference to FIG. 4, an FDD DL and TDD DL subframes use first n OFDM symbols of a subframe to transmit PDCCH, PHICH, PCFICH or the like, which is a physical channel used for transmitting various control informations and use the rest of OFDM symbols to transmit PDSCH. The number of symbols used for transmitting a control channel in each subframe is delivered to a user equipment dynamically via such a physical channel as PCFICH and the like or semi-statically via RRC signaling. The n value may be set from 1 symbol to maximum 4 symbols according to subframe characteristics and system characteristics (FDD/TDD, system bandwidth, etc.). Meanwhile, PDCCH, a physical channel used for transmitting DL/UL scheduling and various kinds of control information, is transmitted via a limited OFDM symbols in a legacy LTE system. Hence, an introduction of an enhanced PDCCH (E-PDCCH), which is multiplexed with PDSCH more freely in a manner of FDM/TDM, is under consideration.

Figure 10:
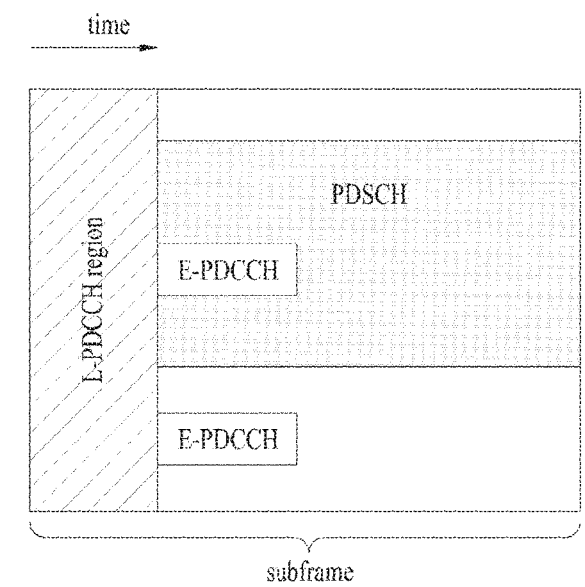
FIG. 10 is a diagram for explaining an example of assigning a PDCCH in a data region of a subframe.

FIG. 10 illustrates an example of assigning a downlink physical channel to a data region of a subframe.

Referring to FIG. 10, PDCCH according to a conventional LTE/LTE-A system (for convenience, legacy PDCCH) may be assigned to a control region in a subframe (refer to FIG. 4). In the figure, L-PDCCH region means a region to which legacy PDCCH is able to be assigned. According to the context, a L-PDCCH region may mean a control region, a control channel resource region (i.e., CCE resource) where PDCCH is practically assigned, or a PDCCH search space. Meanwhile, PDCCH may be additionally assigned to a data region (e.g., a resource region for PDSCH, refer to FIG. 4). The PDCCH assigned to a data region is referred to as an E-PDCCH. Although the figure shows a case that one E-PDCCH exists in one slot, this is for exemplary purposes only. The E-PDCCH may exist by a subframe unit (i.e., through two slots). As shown, by additionally obtaining control channels resources by means of E-PDCCH, scheduling limitations due to the limited control channel resources of L-PDCCH region can be alleviated.

In the following description, a method of allocating and managing a resource for a DL control channel by using a data region (e.g., PDSCH) in a subframe is described with reference to drawings. For convenience, although the following description is described centering on the relationship between a base station and a user equipment, the present invention may be identically/similarly applied to the relationship between a base station and a relay or the relationship between a relay and a user equipment as well. Hence, the relationship between a base station and a UE may be replaced by the relationship between a base station and a relay or the relationship between a relay and a UE in the following description. From the perspective of receiving a signal, a relay and a UE may be generalized as a receiving end. In case that a relay operates as a receiving end, E-PDCCH may be replaced by R-PDCCH (relay-PDCCH).

First, E-PDCCH is explained in more detail. E-PDCCH carries DCI. Regarding DCI, refer to the description with reference to Table 2. For instance, E-PDCCH may be able to carry DL/UL scheduling information. The process for E-PDCCH/PDSCH or E-PDCCH/PUSCH is identical/similar to the description with reference to S107 and S108 of FIG. 1. That is, a user equipment receives an E-PDCCH and may be then able to receive data/control information via a PDSCH corresponding to the E-PDCCH. And, the user equipment receives an E-PDCCH and may be then able to transmit data/control information via a PUSCH corresponding to the E-PDCCH. Processes for E-PDCCH transmission (e.g., channel coding, interleaving, multiplexing, and the like) may be performed using the processes defined for the conventional LTE (refer to FIGS. 5 and 6) within a varying scope and may be modified as necessary.

Meanwhile, the conventional LTE system employs that a PDCCH candidate region (hereinafter, PDCCH search space) is reserved in advance within a control region and a PDCCH for a specific user equipment is transmitted via a part of the reserved region. Hence, a user equipment may be able to obtain PDCCH of its own in a PDCCH search space via a blind decoding. Similarly, E-PDCCH may be transmitted through a part or a whole of pre-reserved resources.

Figure 11:
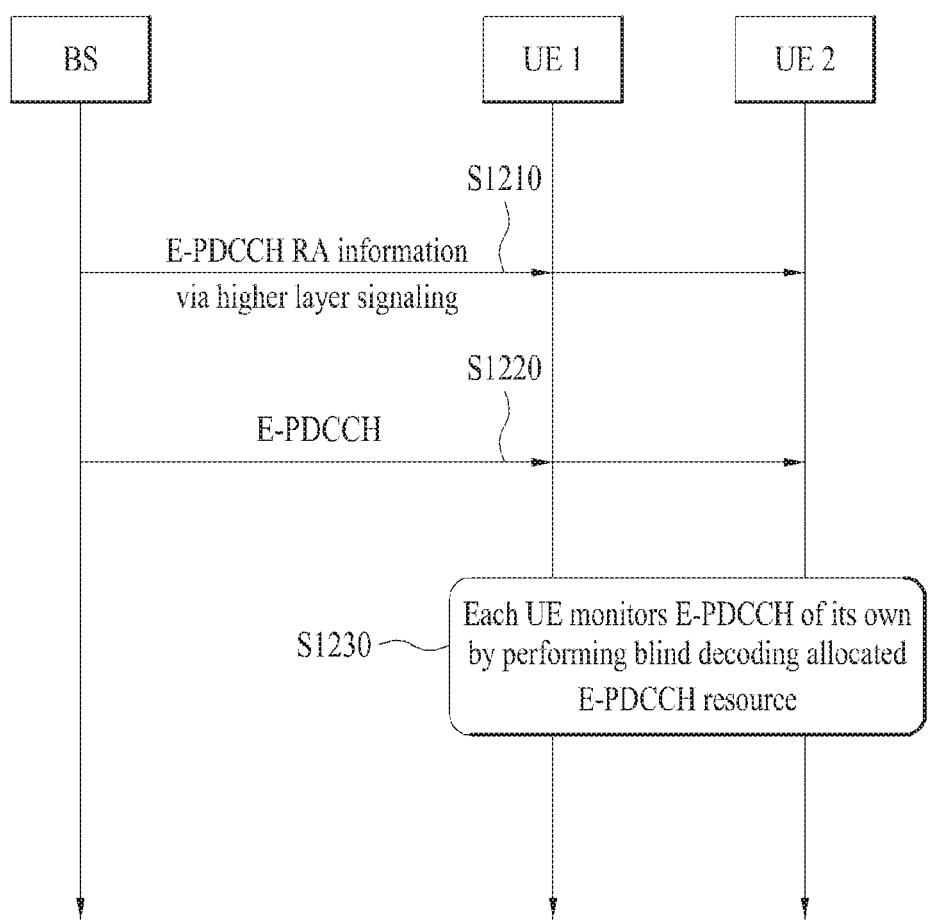
FIG. 11 is a diagram for explaining an example of resource allocation for an E-PDCCH and a PDSCH receiving process.

FIG. 11 illustrates an exemplary process for resource allocation and receiving of E-PDCCH.

Referring to FIG. 11, a base station transmits E-PDCCH resource allocation (RA) information to a user equipment [S1210]. The E-PDCCH RA information may include RB (or VRB (virtual resource block)) assignment information. The RB assignment information may be provided by a RB unit or a RBG (resource block group) unit. A RBG includes 2 or more contiguous RBs. The E-PDCCH RA information may be transmitted using an upper layer (e.g., RRC) signaling. In this case, the E-PDCCH RA information is used to pre-reserve an E-PDCCH resource (region). Then, the base station transmits an E-PDCCH to the user equipment [S1220]. The E-PDCCH may be transmitted within a part or a whole of E-PDCCH resources (e.g., M number of RBs) reserved in the step S1210. Hence, the user equipment monitors a resource (region) (hereinafter an E-PDCCH search space, simply a search space) via which the E-PDCCH may be transmitted [S1230]. The E-PDCCH search space may be given as a part of the RB set assigned in the step S1210. In this case, monitoring may include blind decoding a plurality of E-PDCCH candidates in the search space.

Example: Transmission of Control Information in Consideration of a Special Subframe In case of a TDD-based LTE (LTE-A) system, as shown in FIG. 2(b), a timing gap is necessary when a DL subframe converts to a UL subframe. To this end, a special subframe (SF) is included between a DL SF and a UL SF. A special SF may have various configurations according to situations such as radio conditions, the position of a UE, and the like.

Table 5 shows an example of a special SF. In a special SF, DwPTS/GP/UpPTS may be variously configured according to combinations of special SF configuration (simply, S configuration) and CP.

TABLE 5

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ (3 symbols) | $2192 \cdot T_S$ | $2560 \cdot T_S$ | $7680 \cdot T_S$ (3 symbols) | $2192 \cdot T_S$ | $2560 \cdot T_S$ |
| 1 | $19760 \cdot T_S$ (9 symbols) | | | $20480 \cdot T_S$ (8 symbols) | | |
| 2 | $21952 \cdot T_S$ (10 symbols) | | | $23040 \cdot T_S$ (9 symbols) | | |
| 3 | $24144 \cdot T_S$ (11 symbols) | | | $25600 \cdot T_S$ (10 symbols) | | |
| 4 | $26336 \cdot T_S$ (12 symbols) | | | $7680 \cdot T_S$ (3 symbols) | $4384 \cdot T_S$ | $5120 \cdot T_S$ |
| 5 | $6592 \cdot T_S$ (3 symbols) | $4384 \cdot T_S$ | $5120 \cdot T_S$ | $20480 \cdot T_S$ (8 symbols) | | |
| 6 | $19760 \cdot T_S$ (9 symbols) | | | $23040 \cdot T_S$ (9 symbols) | | |
| 7 | $21952 \cdot T_S$ (10 symbols) | | | — | — | — |
| 8 | $24144 \cdot T_S$ (11 symbols) | | | — | — | — |

In Table 5, a number in bracket indicates the length of a DwPTS period represented by the number of OFDM symbols. For convenience, a DL SF, a UL SF, and a special SF are denoted by D, U, and S, respectively.

Figure 12:
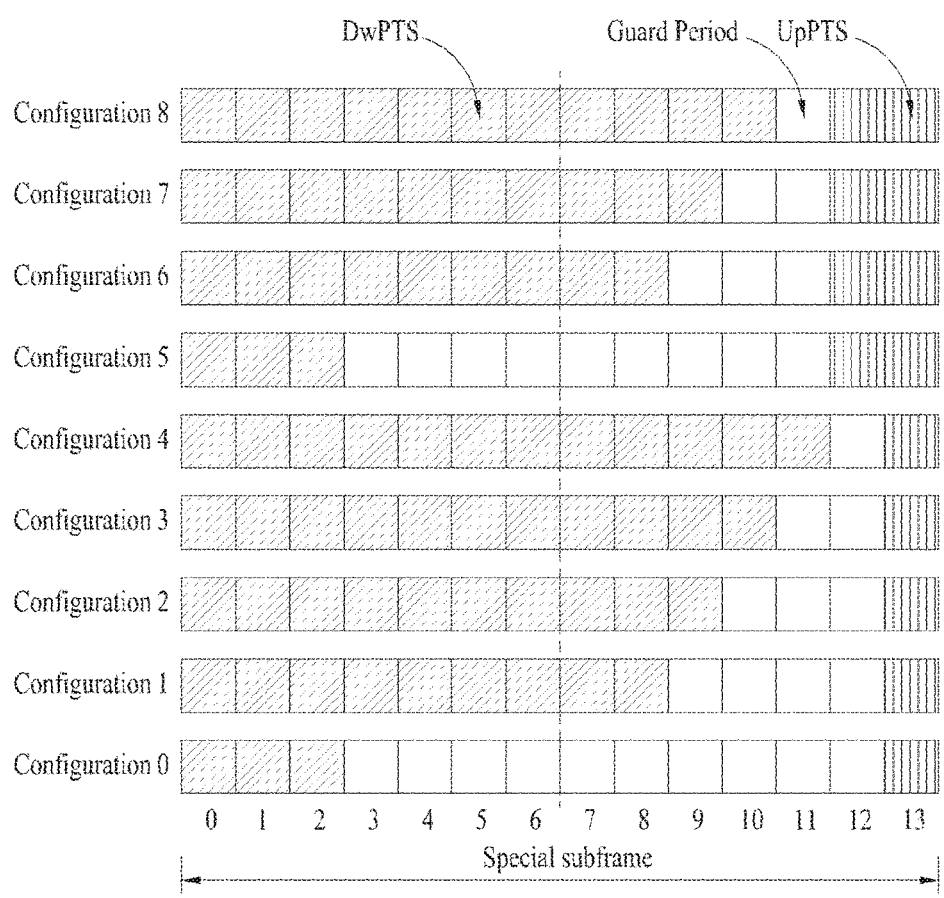
FIG. 12 is a diagram for explaining an example of a structure of a special subframe in case that a normal CP (cyclic prefix) is configured.

FIG. 12 shows the number of OFDM symbols in DwPTS, GP, and UpPTS according to configurations of Table 5. For convenience, FIG. 12 shows an exemplary case that normal CP is used (that is, 14 OFDM symbols per subframe). Referring to FIG. 12, the number of OFDM symbols available for a DL transmission (i.e., DwPTS) varies according to S configuration. Specifically, in case of S configuration #0 and #5, first 3 OFDM symbols of the first slot may be used for DwPTS. On the contrary, in case of S configuration #1, #2, #3, #4, #6, #7, #8, all OFDM symbols of the first slot may be used for DwPTS.

As shown in FIG. 12, in case of a specific S configuration having a short DwPTS period (e.g., S configuration #0 or #5), a PDSCH region does not exist or partly exists in a S SF. Hence, in case that E-PDCCH is employed in a TDD system, it may not be possible to use E-PDCCH in a S SF according to an S configuration or may be inevitable to use E-PDCCH having a structure different from that of a general D. In this case, a general D may indicate a subframe configured as D according to the UL-DL configuration (e.g., Table 1). In the present specification, D means a general D if there is no specific mention.

In the following description, the present invention proposes a method of configuring a PDCCH search space (SS) in a S SF and a method of transmitting/receiving PDCCH, in case that E-PDCCH is configured to use in a TDD system.

In this case, an L-PDCCH region may mean a control region, a control channel resource region (e.g., CCE resource) to which a PDCCH can be assigned within the control region, or a PDCCH search space according to the context. Similarly, an E-PDCCH region may mean a data region (refer to FIG. 4), a control channel resource region to which PDCCH can be assigned within the data region (i.e., a VRB resource allocated by an upper layer; refer to FIG. 11), or an E-PDCCH search space.

In this case, legacy PDCCH and E-PDCCH may be collectively referred to as PDCCH unless they are treated differently.

For convenience, the present invention is explained under the following assumptions.

4 kinds of CCE aggregation levels (L=1, 2, 4, 8) exist and the number of PDCCH candidates for CCE aggregation levels is defined by 6, 6, 2, and 2, respectively. For convenience, it is assumed that an E-PDCCH of a aggregation level L is transmitted through L number of RBs.

Maximum 3 kinds of DCI format groups may be configured according to transmission modes. DCI format group may be defined by purpose/function/characteristics and the like. For instance, a DCI format group includes (i) a DL-dedicated DCI format group used only for DL scheduling (e.g., DCI format 2), (ii) a DL/UL-common DCI format group used for selectively performing DL/UL scheduling in a manner of sharing one DCI payload size (e.g., DCI format 0/1A), (iii) a UL-dedicated DCI format group used only for UL scheduling (e.g., DCI format 4). A DCI format group may be replaced by a PDCCH candidate group. A PDCCH candidate group may be classified according to a CCE aggregation level (irrespective of a DCI format).

In addition, a PDCCH candidate group may be configured by different subsets for PDCCH candidates within CCE aggregation levels.

Although the present invention is explained based on a CCE aggregation level for coding PDCCH, the number of PDCCH candidates for which blind decoding should be performed, a DCI format for DL/UL scheduling, and the like as defined in the conventional LTE/LTE-A system, it is apparent that the present invention may be expanded/applied to a aggregation level, the number of PDCCH candidates, a DCI format and the like, which will be added or modified to a future standard in a similar manner.

The present invention is now described in detail. The following description is described centering on E-PDCCH transmission/reception in a special subframe. Hence, a detailed explanation on operations in a general D and L-PDCCH may refer to the conventional art.

First, a method of configuring a SS in a general D is described as follows (Alt 1 to 2).

Alt 1: assigning a SS to an E-PDCCH region within a $1^{st}$ slot and an E-PDCCH region within a $2^{nd}$ slot DCI formats are classified into DCI format group X or Y. A SS for DCI format group X may be configured in an E-PDCCH (PDSCH) region within the $1^{st}$ slot and the SS for DCI format group Y may be configured in the E-PDCCH (PDSCH) region within the $2^{nd}$ slot. The SS for DCI format X or Y may be configured with at least 4 OFDM symbols.

Alt 2: assigning a SS to an E-PDCCH region within a $1^{st}$ slot and an E-PDCCH region within a $2^{nd}$ slot DCI formats are classified into DCI format group A, B or C. A SS for DCI format group A may be configured in the conventional L-PDCCH region, and a SS for DCI format group B or C may be configured in an E-PDCCH (PDSCH) region within the $1^{st}$ slot and the $2^{nd}$ slot, respectively. The SS for DCI format B or C may be configured with at least 4 OFDM symbols.

In case that a SS for PDCCH transmission/detection in a general D is configured as mentioned above, a method of transmitting/detecting PDCCH in a S SF and a method of configuring a SS for the same are described as follows.

Sol 1: Transmission/detection for a PDCCH that is to be scheduled via the S SF is performed in a D before the corresponding S SF. That is, E-PDCCH transmission/reception is not performed in the S SF.

Transmission/detection for PDCCH (S-PDCCH) that is configured to be scheduled via S SF may be performed in D which exists (right) before a corresponding S SF, instead. In this case, distinguishing between S-PDCCH and PDCCH (D-PDCCH) that is originally configured to be scheduled in D is performed by 1) independently configuring SS for S-PDCCH and SS for D-PDCCH (separate signaling may be additionally accompanied to allocate a SS resource (e.g., CCE or RE) for S-PDCCH within an E-PDCCH region of D), 2) commonly configuring SS for S-PDCCH and D-PDCCH and including a flag (e.g., 1 bit) in corresponding PDCCH, the flag used for distinguishing between S-PDCCH and D-PDCCH. In this case, SS structure for S-PDCCH may be configured in a manner identical to SS structure of a general D.

FIG. 13 illustrates an example of performing transmission/reception of PDCCH according to Sol 1. It is assumed that UL-DL configuration #1 is configured in the present example. Referring to FIG. 13, a PDCCH for a S SF (special subframe) (S-PDCCH) is detected in a D which exists (right) before the S SF, instead (①). If the S-PDCCH is detected in the D, the user equipment may receive a PDSCH signal in a corresponding S SF or may transmit a PUSCH signal in a U corresponding to the S SF (②).

Sol 2: Transmission/detection for all PDCCHs (DCI formats) is performed only via an L-PDCCH region in S SF. That is, E-PDCCH transmission/reception/detection is not performed in S SF.

In S SF, transmission/detection for all PDCCHs (DCI formats) is performed only via an L-PDCCH region. The present method can be applied irrespective of a PDCCH transmission structure in a general D and an S configuration (i.e., the length of DwPTS period). For instance, in case that Alt 1 is applied to a general D, one SS can be commonly configured in an L-PDCCH region for DCI group X, Y in a S SF. (thereby, PDCCH transmission/detection for both DCI format groups X and Y may be performed). In addition, in case that Alt 2 is applied to a general D, PDCCH transmission/detection for all the DCI format groups A, B, and C may be performed via an SS within a L-PDCCH region configured for DCI format group A in the S SF.

FIG. 14 illustrates an example of performing PDCCH transmission/reception according to Sol 2. Referring to FIG. 14, a PDCCH transmission/detection process in a general D may be performed for L-PDCCH and/or E-PDCCH according to a subframe configuration. On the other hand, a PDCCH detection process may be performed on the assumption that E-PDCCH is not transmitted in S SF irrespective of S configuration (②). That is, a PDCCH detection process can be performed for L-PDCCH only in S SF.

Sol 3: Differently configuring a PDCCH (DCI format) transmission region according to S configuration (e.g., the length of DwPTS period)

SS configuration for transmitting/detecting PDCCH (DCI format) may be configured differently according to S configuration (e.g., the length of DwPTS period) (e.g., Table 5) in S SF. A detailed method is described as follows.

1) Case #1: in case that the number of OFDM symbols within DwPTS is less than M (e.g., M=6): Sol 2 may be applied. That is, transmission/detection of all PDCCHs (DCI formats) can be performed only via a L-PDCCH region in S SF. On the other hand, from the perspective of E-PDCCH, in case that the number of OFDM symbols within DwPTS is less than M (e.g., M=6), a user equipment may operate on the assumption that there is no E-PDCCH in S SF. That is, a user equipment may not expect reception of E-PDCCH in S SF and thus may not perform an E-PDCCH receiving process (e.g., E-PDCCH monitoring, blind decoding, and the like). Instead, as suggested earlier, PDCCH (DCI format) can be transmitted/received/detected via a L-PDCCH region in S SF in which E-PDCCH monitoring is not performed. Meanwhile, since the number of OFDM symbols within DwPTS is given by using S configuration as shown in Table 5, the present method may be equivalently represented using S configuration. For instance, the present method may be understood as an operation performed when a specific S configuration(s) is configured. In this case, the specific S configuration means a S configuration that the number of OFDM symbols within DwPTS is less than M (e.g., M=6). Referring to Table 5, the present method may be applied to S configuration #0 or #5 in case of DL normal CP, and may be applied to S configuration #0 or #4 in case of DL extended CP, but is not limited thereto.

2) Case #2: in case that the number of OFDM symbols within DwPTS is greater than N (e.g., N=7) (N>M, (e.g., N=M+1)): transmission/detection of PDCCH (DCI format) may be performed in an E-PDCCH region in S SF. If the present method is equivalently represented using S configuration, referring to Table 5, the present method may be applied to S configuration #1 to #4 or #6 to #8 in case of DL normal CP, and may be applied to S configuration #1 to #3 or #5 to #7 in case of DL extended CP. Meanwhile, in case that Alt 1 is applied to a general D, only an E-PDCCH region can be configured even in S SF. That is, in S SF in which is permitted to transmit E-PDCCH, a user equipment may perform a detecting process for E-PDCCH (e.g., monitoring E-PDCCH candidates), and may omit/skip a detecting process for L-PDCCH. On the other hand, in case that Alt 2 is applied to a general D, both a L-PDCCH region and an E-PDCCH region may be configured in S SF. That is, in S SF in which is permitted to transmit E-PDCCH, a user equipment may perform a detecting process for both L-PDCCH and E-PDCCH. From the perspective of blind decoding complexity, in S SF in which is permitted to transmit E-PDCCH, it is preferable to perform transmission/reception/detection of E-PDCCH. Meanwhile, the size of a E-PDCCH region is limited in S SF due to GP and UpPTS. If E-PDCCH (DCI format)/E-PDCCH SS is defined by a slot unit, the following three methods (Opt 1 to 3) may be considered.

Opt 1: PDCCH transmitted/detected via an E-PDCCH region within a second slot in a general D may be configured to be transmitted/detected via an L-PDCCH region in S SF. For instance, in case that Alt 1 is applied to a general D, SSs for DCI format groups X and Y may be configured in an E-PDCCH region within a first slot and an L-PDCCH region in the S SF, respectively. In addition, in case that Alt 2 is applied to a general D, SSs for DCI format groups A and B may be configured in a L-PDCCH region and an E-PDCCH within a first slot, respectively. That is, PDCCH transmission/detection of both DCI format groups A and C may be performed via the SS in a L-PDCCH region which is configured for DCI format group A.

In case of applying Opt 1, it is advantageous in that an E-PDCCH structure applied to a general D can be re-used in S SF without any modification/transformation, since the conventional L-PDCCH is re-used.

Opt 2: PDCCHs transmitted/detected via E-PDCCH regions within first and second slots in a general D may be configured to be transmitted/detected via a L-PDCCH region and an E-PDCCH region within the first slot in S SF, respectively. For instance, in case that Alt 1 is applied to a general D, SSs for DCI format groups X and Y may be configured in a L-PDCCH region and an E-PDCCH region within the first slot in a S SF, respectively. In addition, in case that Alt 2 is applied to a general D, SSs for DCI format groups A and C may be configured in a L-PDCCH region and a E-PDCCH region within the first slot in S SF, respectively. That is, PDCCH transmission/detection of both DCI format groups A and B may be performed via the SS in a L-PDCCH region which is configured for DCI format group A.

In case of applying Opt 2, a decoding order for each DCI format group in a general D can be maintained identically for S (time axis) as well. Therefore, a stable signal processing in a user equipment can be guaranteed by early decoding of DL data and the like.

Opt 3: a PDCCH, which is transmitted/detected via an E-PDCCH region within a first and second slots in a general D, may be configured to be transmitted/detected only via an E-PDCCH region within the first slot in a S SF. For instance, in case that Alt 1 is applied to a general D, a SS for a DCI format group X may be configured in the E-PDCCH region within the first slot in the S SF. That is, PDCCH transmission/detection for both DCI format groups A and B may be performed via the corresponding SS. And, in case that Alt 2 is applied to a general D, the SS for DCI format groups A and B may be respectively configured in the L-PDCCH region and the E-PDCCH region within the first slot, in the S SF. That is, PDCCH transmission/detection for both DCI format groups B and C may be performed via the SS which is configured for DCI format group B. As an alternative, in case that Alt 1 is applied to a general D, the SS for DCI format groups X and Y may be independently configured in the E-PDCCH region within the first slot in the S SF. And, in case that Alt 2 is applied to the general D, the SS for the DCI format group A is configured in the L-PDCCH region and the SS for each of DCI format group B or C may be independently configured in the E-PDCCH region within the first slot. In this case, in order to additionally configure a SS (or a SS for DCI format group C) for DCI format group Y in the E-PDCCH region within the first slot of the S SF, signaling may be additionally accompanied to allocate a SS resource (e.g., CCE or RE).

In case of applying Opt 3, the DCI format group capable of being transmitted via the E-PDCCH region in the general D is identically maintained in the S SF as well. Therefore, it may be possible to transmit a PDCCH having a strong tolerance to an interference occurring from an L-PDCCH region and securing an enhanced performance (via using a UE-specific DMRS and the like).

Meanwhile, in case that the number of OFDM symbols within a DwPTS is greater than or equal to a specific number (e.g., 11) in Case #2 of Sol 3 method, E-PDCCH region may be configured with more than L (e.g., 4) number of OFDM symbols in first and second slots. In this case, it is possible to directly apply a PDCCH transmission structure and a SS configuration to a S SF, which are applied to a general D such as Alt 1 or Alt 2 and the like.

Table 6 as shown in FIG. 17 indicates an example that Sol 3 is applied to Table 5. A shadow indicates the case that Case #1 is applied to a S SF (i.e., except an E-PDCCH reception).

Figures 15, 16:
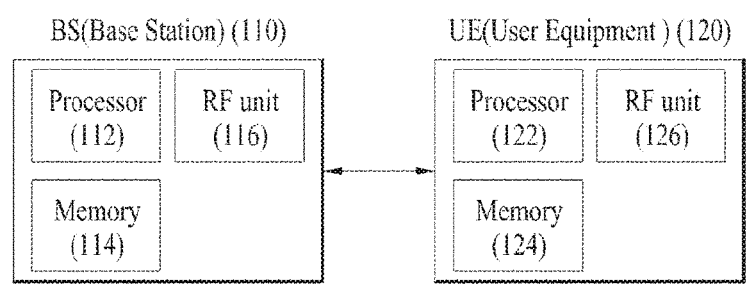

FIG. 15 illustrates an example of transmitting/receiving a PDCCH according to Sol 3. X corresponds to D or U and is given according to a UL-DL configuration. Referring to FIG. 15, E-PDCCH transmission/detection may be selectively performed according to the UL-DL configuration in a S SF (①). For instance, if a UL-DL configuration corresponds to the shadows of Table 6 (i.e., Case #1), a PDCCH transmission/detection process may be performed on the assumption that there is no E-PDCCH transmission in a S SF. As one example, an E-PDCCH detection process may be omitted or skipped in the S SF. On the other hand, in case that a UL-DL configuration does not correspond to the shadows of Table 6 (i.e., case #2), a E-PDCCH transmission/detection process may be normally performed in a S SF.

Meanwhile, in order to avoid a mutual interference between a LTE TDD system deployed in an adjacent frequency and another TDD system (e.g., time division synchronous code division multiple access (TD-SCDMA)) and in order for the systems to stably coexist, employing a new S SF configuration (hereinafter, new-S) is under consideration. Specifically, employing a S configuration in which DwPTS is configured with 6 OFDM symbols in case of DL normal CP (hereinafter new-S for n-CP) and a S configuration that DwPTS is configured with 5 OFDM symbols in case of DL extended CP (hereinafter, new-S for e-CP) is under consideration.

Table 7 as shown in FIG. 18 shows an example that a new-S for n-CP and a new-S for e-CP are added to the conventional S SF configuration (i.e., Table 5). Shadows indicate the new-S for n-CP and the new-S for e-CP. In case that the new-S for n-CP and the new-S for e-CP are configured, the length of UpPTS may be newly defined or may follow the conventional configurations as exemplarily shown in Table 7.

In consideration of DwPTS configurations according to the new-S for n-CP and the new-S for e-CP, a transmission mode and a corresponding RS structure may be applied as follows.

In case of TM 8 or TM 9
    for new-S for n-CP, supported is demodulation based on DRMS (demodulation reference signal) which is transmitted using antenna ports #7 to #10 via the $3^{rd}$ and $4^{th}$ OFDM symbols (of DwPTS) within the $1^{st}$ slot.
    for new-S for e-CP, DMRS-based demodulation is not supported.

In case of TM 7
    for the new-S for e-CP, supported is demodulation based on DRMS (demodulation reference signal) which is transmitted using an antenna port #5 via the $5^{th}$ OFDM symbol (of DwPTS) within the $1^{st}$ slot.
    for the new-S for n-CP, DMRS-based demodulation is not supported.

In case of E-PDCCH, in order to enhance transmission performance of control channels through a UE-specific precoding, DMRS-based transmission using antenna ports #7 to #14 or a subset thereof (based on TM 9) may be mainly considered. In this case, since the DMRS-based demodulation (of DL data) using antenna ports #7 to #14 or a subset thereof is not supported, E-PDCCH transmission may be not permitted as well.

Therefore, although a TDD system is configured to use E-PDCCH, if a S SF is not permitted to use the DMRS-based demodulation using antenna ports #7 to #14 or a subset thereof, the present invention proposes to apply Sol 2 (i.e., permits/assumes L-PDCCH transmission only) to a S SF. For instance, in case that DwPTS is configured with a S configuration configured with the specific number (e.g., 3) of OFDM symbols and the new-S for e-CP, only Sol 2 may be applied (to S SF) (i.e., only L-PDCCH transmission may be permitted/assumed).

Table 8 as shown in FIG. 19 shows an example that Sol 3 and the aforementioned additional proposal are applied to Table 7. Shadows indicate the cases that Case #1 is applied to S SF (i.e., except E-PDCCH reception).

FIG. 16 is a diagram for explaining an example of a base station, a relay, and a user equipment applicable to the present invention.

Referring to FIG. 16, a wireless communication system may include a base station (BS) 110 and a user equipment (UE) 120. In case that the wireless communication system includes a relay, the base station or the user equipment may be replaced by the relay.

The base station 110 includes a processor 112, a memory 114 and a radio frequency (RF) unit 116. The processor 112 may be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a relay and a base station. The signal transmission/reception relation identically/similarly expands to the signal transmission/reception relation between a user equipment and a base station or between a user equipment and a relay. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' may be replaced by such a terminology as a fixed station, a Node B, an eNode B (eNB), an access point, and the like. And, 'user equipment (UE)' may be replaced by such a terminology as a terminal, a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention can be used by a user equipment device, a base station, or a different device of a wireless mobile communication system. Specifically, the present invention can be applied to a method of transmitting a UL control information and apparatus therefor.

What is claimed is:

1. A method performed by a user equipment (UE) in a wireless communication system using Time Division Duplex (TDD), the method comprising:
configuring a specific subframe comprising a downlink period, a guard period, and an uplink period, each length of the downlink period, the guard period, and the uplink period being given according to a specific subframe configuration for the configured specific subframe,
wherein, for a normal cyclic prefix (CP) in downlink, the length of the downlink period is given by a following table according to the specific subframe configuration for the configured specific subframe,

| Specific Subframe Configuration | Length of downlink period (the number of OFDM symbols) |
| --- | --- |
| 0 | 3 |
| 1 | 9 |
| 2 | 10 |
| 3 | 11 |
| 4 | 12 |
| 5 | 3 |
| 6 | 9 |
| 7 | 10 |
| 8 | 11 | wherein a detection of a physical downlink control channel (PDCCH) in a resource region from a specific OFDM symbol other than a starting OFDM symbol within the configured specific subframe is not performed by the UE for subframe configuration 0 and 5.

2. The method according to claim 1, wherein a demodulation reference signal (DMRS) transmission is not allowed for subframe configuration 0 or 5.

3. The method according to claim 1, wherein, for an extended CP in downlink, the length of the downlink period is given by a following table according to the specific subframe configuration:

| Specific Subframe Configuration | Length of downlink period (the number of OFDM symbols) |
| --- | --- |
| 0 | 3 |
| 1 | 8 |
| 2 | 9 |
| 3 | 10 |
| 4 | 3 |
| 5 | 8 |
| 6 | 9 |
| 7 | 5. |

4. The method according to claim 3, wherein, for the extended CP in downlink, a demodulation reference signal (DMRS) transmission is not allowed for subframe configuration 0, 4, or 7.

5. The method according to claim 3, wherein, for the extended CP in downlink, the detection of the PDCCH in the resource region of the configured specific subframe is not performed by the UE for subframe configuration 0, 4, or 7.

6. The method according to claim 1, wherein the PDCCH is an E-PDCCH (Enhanced PDCCH).

7. The method according to claim 6, wherein a position of the specific OFDM symbol within the configured specific subframe is indicated through a radio resource control (RRC) signaling or through a physical control format indicator channel (PCFICH).

8. A user equipment (UE) configured to operate in a wireless communication system using Time Division Duplex (TDD), the UE comprising:
a radio frequency (RF) unit; and
a processor operatively connected to the RF unit and configured to:
configure a specific subframe comprising a downlink period, a guard period, and an uplink period, each length of the downlink period, the guard period, and the uplink period being given according to a specific subframe configuration for the configured specific subframe, and
wherein, for a normal cyclic prefix (CP) in downlink, the length of the downlink period is given by a following table according to the specific subframe configuration for the configured specific subframe,

| Specific Subframe Configuration | Length of downlink period (the number of OFDM symbols) |
| --- | --- |
| 0 | 3 |
| 1 | 9 |
| 2 | 10 |
| 3 | 11 |
| 4 | 12 |
| 5 | 3 |
| 6 | 9 |
| 7 | 10 |
| 8 | 11 | wherein a detection of a physical downlink control channel (PDCCH) in a resource region from a specific OFDM symbol other than a starting OFDM symbol within the configured specific subframe is not performed by the UE for subframe configuration 0 and 5.

9. The UE according to claim 8, wherein a demodulation reference signal (DMRS) transmission is not allowed for subframe configuration 0 or 5.

10. The UE according to claim 8, wherein, for an extended CP in downlink, the length of the downlink period is given by a following table according to the specific subframe configuration:

| Specific Subframe Configuration | Length of downlink period (the number of OFDM symbols) |
| --- | --- |
| 0 | 3 |
| 1 | 8 |
| 2 | 9 |
| 3 | 10 |
| 4 | 3 |
| 5 | 8 |
| 6 | 9 |
| 7 | 5. |

11. The UE according to claim 10, wherein, for the extended CP in downlink, a demodulation reference signal (DMRS) transmission is not allowed for subframe configuration 0, 4, or 7.

12. The UE according to claim 10, wherein, for the extended CP in downlink, the detection of the PDCCH in the resource region of the configured specific subframe is not performed by the UE for subframe configuration 0, 4, or 7.

13. The UE according to claim 8, wherein the PDCCH is an E-PDCCH (Enhanced PDCCH).

14. The UE according to claim 13, wherein a position of the specific OFDM symbol within the configured specific subframe is indicated through a radio resource control (RRC) signaling or through a physical control format indicator channel (PCFICH).

* * * * *